Feb. 14, 1939.  E. S. CORNELL, JR  2,147,243
METHOD OF PRODUCING INTEGRAL WROUGHT VALVE
BODIES AND THE RESULTING VALVE BODIES
Filed March 22, 1935  3 Sheets-Sheet 1
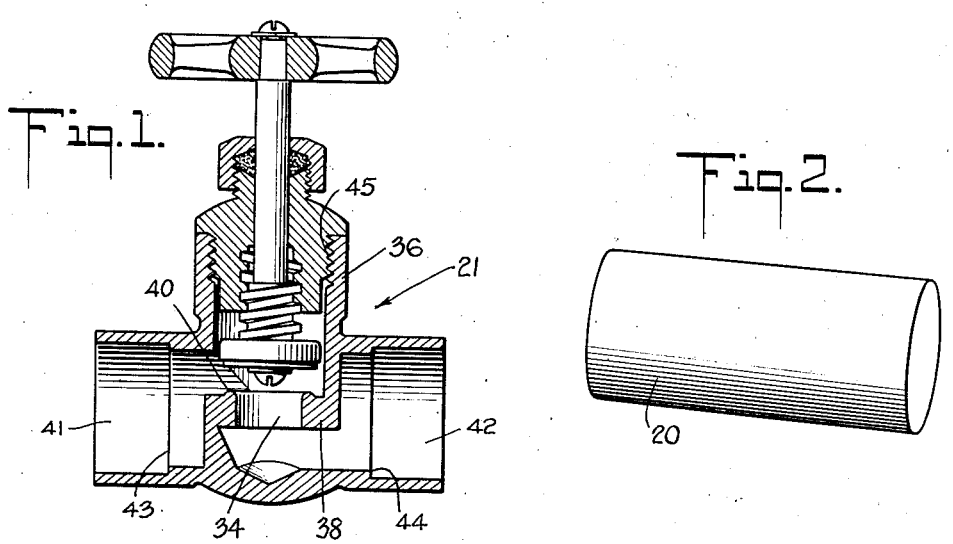
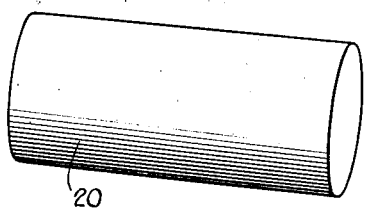
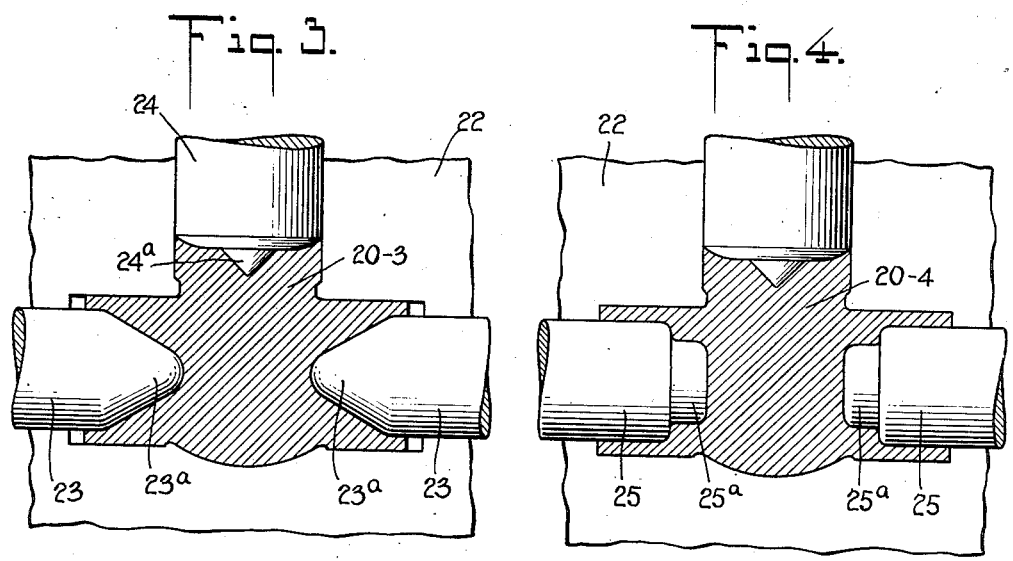
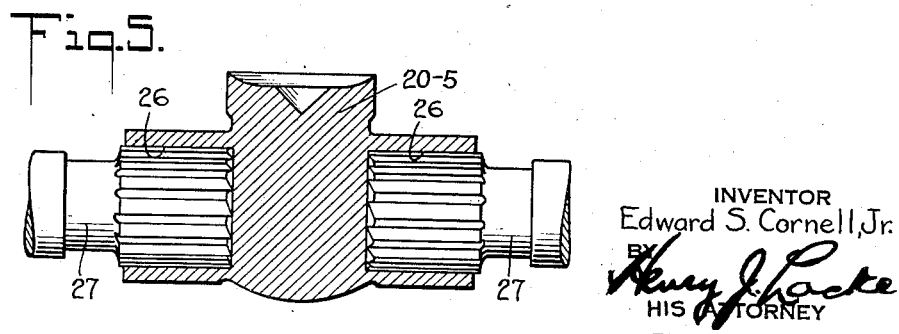
INVENTOR
Edward S. Cornell, Jr.
BY
HIS ATTORNEY Feb. 14, 1939. E. S. CORNELL, JR 2,147,243
METHOD OF PRODUCING INTEGRAL WROUGHT VALVE
BODIES AND THE RESULTING VALVE BODIES
Filed March 22, 1935 3 Sheets-Sheet 2

INVENTOR
Edward S. Cornell, Jr.
BY
Henry J. Lucke
HIS ATTORNEY

Feb. 14, 1939.  E. S. CORNELL, JR  2,147,243
METHOD OF PRODUCING INTEGRAL WROUGHT VALVE
BODIES AND THE RESULTING VALVE BODIES
Filed March 22, 1935  3 Sheets-Sheet 3
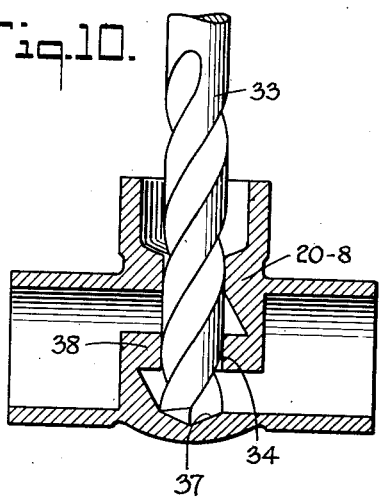
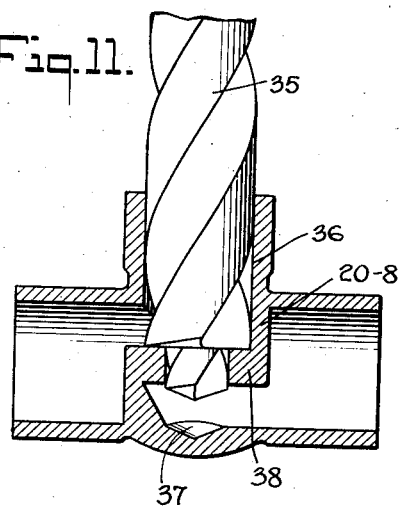
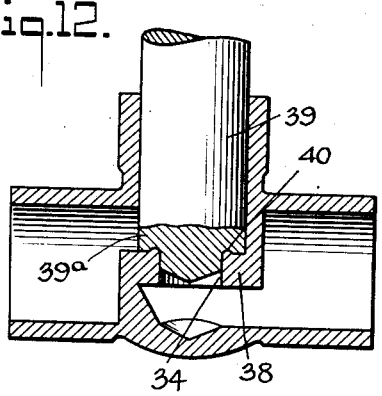
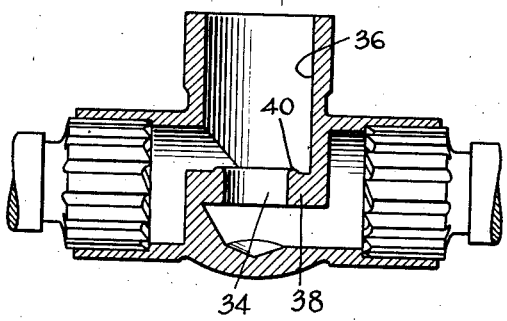
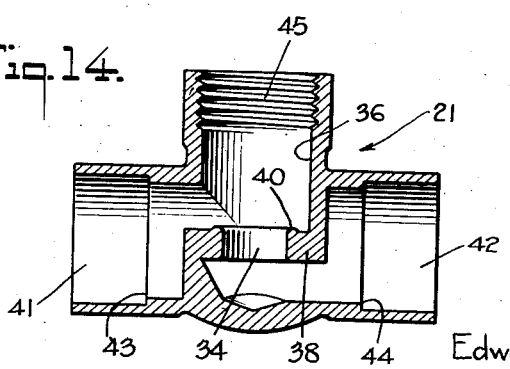
INVENTOR
Edward S. Cornell, Jr.
BY
HIS ATTORNEY Patented Feb. 14, 1939

2,147,243

UNITED STATES PATENT OFFICE 2,147,243

METHOD OF PRODUCING INTEGRAL WROUGHT VALVE BODIES AND THE RESULTING VALVE BODIES

Edward S. Cornell, Jr., Larchmont, N. Y., assignor to American Radiator Company, New York, N. Y., a corporation of New Jersey Application March 22, 1935, Serial No. 12,377

13 Claims. (Cl. 29—157.1)

My present invention relates to an improved method of producing integral wrought bodies for valves and the like, and to the integral wrought valve bodies so produced.

In general my method comprises subjecting a predetermined mass of metal or like material to a combination treatment including extruding, heading, drawing and other appropriate forms of integral wrought fashioning, the stated mass having a proper content with respect to the mass of the ultimate valve body, whereby the resultant body is provided with a lateral of desired length and cross-section and configuration integral of itself and integral with the walls of the body per se and passage wall members disposed within the otherwise hollow interior of the valve body defining passage for fluid therethrough and serving also as the seat, or for supporting a seat, for the movable valve member.

My method is of especial advantage in the production of bodies of valves and the like of copper and alloys predominately of copper content, the respective sequence of integral wrought fashioning of the mass being effected in the absence of supplied heat, thus avoiding the formation of cuprous and/or other oxids and other deleterious conditions.

The product resulting from my method, accordingly, embodies a body proper provided with end openings, a lateral, passage wall members disposed with the valve body, each and all of the same being of desired cross-section, wall formation, and configuration, each of the same being integral of itself and integral with one another and without joint and wrought to final status by cold working.

An exemplification of a valve body producible by my present invention is set forth and claimed in my copending application entitled Integral wrought metal valve bodies, filed March 22, 1935, bearing Serial No. 12,378.

Further features and objects of my invention will be more fully understood from the following detail description and the accompanying drawings, in which Fig. 1 is a central section of a preferred form of integral wrought valve body made pursuant to my process, the valve, as an exemplification of a product of my process, being shown of the compression type having its movable valve member mounted within the lateral passage.

Fig. 2 represents a mass of predetermined content and suitable configuration from which the desired valve body is to be integrally wrought.

Fig. 3 is a diagrammatic view in central section, illustrating a suitably apertured die and a set of suitably pointed punches and a therewith cooperating plug, indicating an initial stage of treatment of the mass shown in Fig. 2.

Fig. 4 is a like diagrammatic view in central section, illustrating a subsequent stage of the treatment, the shown status of the treated mass being attained by the employment of a set of punches and cooperating plug, appropriate for the indicated treatment.

Fig. 5 is a like diagrammatic view in central section, illustrating a stage of treatment of the mass subsequent to that of Fig. 4, and showing the reaming of the opposing end openings.

Fig. 10 is a diagrammatic view in central section of the valve body after treatment in a die, and illustrating an initial stage of formation of a passageway through the lateral and also the formation of the passage opening through or adjacent to the valve seat.

Fig. 11 is a diagrammatic view in central section of the valve body at a stage subsequent to Fig. 10, indicating the formation of a substantially full passage of the lateral and of the passage opening through the valve seat.

Fig. 12 is a diagrammatic view in central section of the valve body at a stage subsequent to that of Fig. 11, and showing particularly one preferred formation of the valve seat.

Fig. 13 is a diagrammatic view in central section of the valve body at a stage subsequent to that of Fig. 12, and primarily showing a preferred formation of the passages of the end openings.

Fig. 14 is a central vertical section of the valve body resulting from the steps indicated successively in Figs. 2 through 13.

Figure 6:
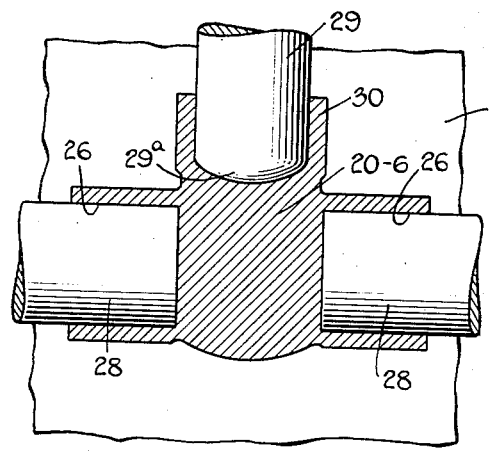
Fig. 6 is a like diagrammatic view in central section, illustrating a stage subsequent to Figs. 4 and 5, the stage indicated in Fig. 6 effecting essentially the desired formation of the wall of the lateral.

Referring to the drawings as one exemplification of a sequence of steps embodying my invention, the mass or blank 20 of metal is selected of predetermined cubical content dependent upon the mass of the valve body, see 21, Fig. 1, desired to be formed therefrom.

Advantageously, in the production of a valve body of general circular configuration, the configuration of the original mass 20 is selected correspondingly, under which premise the mass 20, as indicated in Fig. 2, is illustrated of circular cross-section. In the illustrated instance, the original blank 20 is solid throughout.

Figure 9:
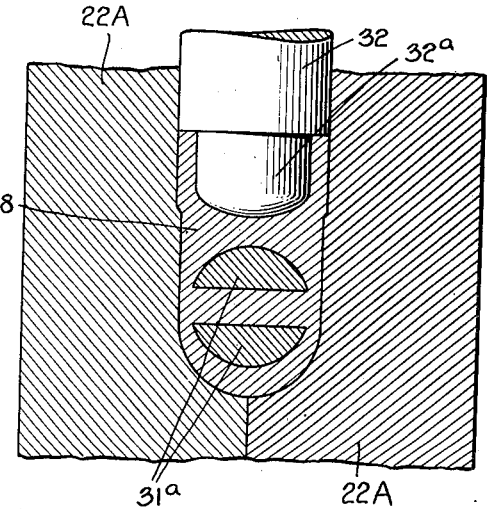
Fig. 9 is a like diagrammatic view in central section, taking the section on line 9—9 of Fig. 8.

An advantageous procedure in the production of a valve body corresponding to the valve body 21, Fig. 1, and see Fig. 14, is by the utilization of a suitable die recessed in correspondence to the configuration to be effected, see Fig. 3. Such die, as is indicated in Fig. 9, is advantageously of the split type, as will be understood by those skilled in the art.

The status of the mass 20—3 shown in Fig. 3, is had by the use of punches 23, 23, in the instant treatment the noses 23a of the punches being suitably pointed to effect the formation of recesses at the opposite ends of the mass 20—3 at which the end openings of the body are ultimately formed. Simultaneously with the operation of the punches 23, 23, I utilize a plug 24, preferably provided with a piercing nose 24a and otherwise contoured at its effective face to initiate the formation of the lateral passage and otherwise initially contour the face of the mass 20—3 extruded by the operation of the stated punches 23, 23 into the recess of the die effecting the formation of the lateral.

The status of the mass 20—4 indicated in Fig. 4, at a stage succeeding that shown in Fig. 3, has been effected by employment of the punches 25, each provided with noses 25a of blunter profile as compared with the noses 23a of the previous punches 23, 23, the punches 25, 25 inclusive of their respective noses 25a, 25a, being of an effective volume to bring about a substantial filling of the recess of the die 22, as appears from a comparison of Fig. 4 with Fig. 3, and to cause the flow of the mass of the metal treated in enlarging the respective recesses formed by the punches at the respective end opening portions of the mass 20—4.

The mass 20—4 as above or equivalently treated is removed from the die, and suitably fashioned to enlarge the end opening passages 26, 26, as by means of reamers 27, 27. The mass treated to the stage illustrated by Fig. 5 is indicated 20—5.

The mass 20—5 is now placed in a die 22A, of the character of the split die shown in Figs. 3 and 4, and plugs 28, 28 positioned within the end opening passages 26, 26, and the punch 29 operated to progress the formation of the lateral, the nose 29a of the punch being suitably contoured and the volume of the effective portion of the punch 29 determined to provide for the flow of the metal, see 30, about the punch 29, whereby the recess formation at the lateral is increased and the wall of the lateral progressed toward the ultimate desired cross-section and configuration. The status of the treated mass shown in Fig. 6 is indicated 20—6.

The mass 20—6, to its status of treatment indicated in Fig. 6, possesses the general attributes of substantial progress of the formation of the passages of the end openings and of the lateral toward their respective ultimate cross-section and configuration. In such or equivalent status the mass 20—6 is further characterized by the solid status of the metal within the body proper at and within the juncture of the passage of the lateral with the fluid passage to be ultimately formed.

Suitable procedure is now carried out for forming a suitable passageway for the flow of fluid inclusive of a flow opening within the valve seat, and also for progressing the passage of the lateral to afford suitable movement of the movable valve member, in this instance to be disposed within the lateral, the aforesaid operations being effected while preserving the integral wrought characteristics of the stated solid portion.

Figure 7:
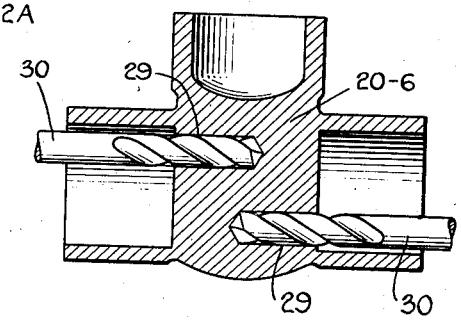
Fig. 7 is a like diagrammatic view in central section, showing a stage subsequent to that of Fig. 6, the operation indicated in Fig. 7 being primarily an initial step of effecting passageways anteriorly and posteriorly of the valve seat.
Figure 8:
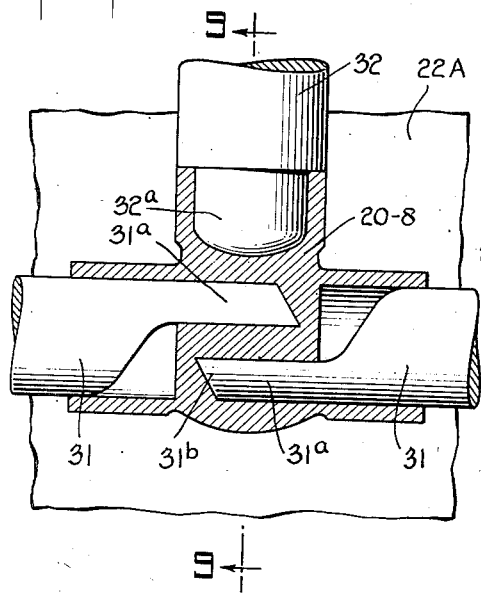
Fig. 8 is a like diagrammatic view in central section, showing a stage subsequent to that of Fig. 7, in the formation of passageways anteriorly and posteriorly of the valve seat.

A convenient procedure to attain the stated objects is as follows:

As one manner of such procedure, initial recesses 29, 29, extending into the spaces ultimately of the anterior and posterior fluid flow passages, may be formed by drilling or equivalent indicated by the drills 30, 30, said recesses 29, 29, being enlarged as by treatment in a die, corresponding to the character of the die 22A indicated in Fig. 6, and cooperating punches 31, 31 and a plug 32, as is indicated in Figs. 8 and 9. The plug 32, as appears in Figs. 8 and 9, is provided with a nose 32a conforming to the recess of the lateral of the treated mass 20—6, see Figs. 6 and 7, and the punches 31, 31, are provided with the effective punching portions 31a, 31a, see Figs. 8 and 9, have a cross-sectional configuration conforming to the desired cross-section of the ultimate anterior and posterior flow passages, such as the segmental configuration indicated in Figs. 8 and 9, and noses 31b of flat effective face disposed at an acute angular relationship with respect to the effective punch portions 31a, 31a.

The resulting treated mass 20—8 is now further treated for the completion of the effective passageway of the lateral and the passage opening through the valve seat, the latter being incident to a compression type of valve. One manner of carrying out such subsequent treatment is indicated in Figs. 10 and 11, namely by the employment of a drill 33 of reduced effective bore corresponding to the desired diameter of the passage opening 34 through the valve seat, such drilling operation affording also the expansion of the opening of the lateral into communication with the anterior and posterior flow passages. The drilling operation indicated in Fig. 11, had by a drill 35 of larger effective bore, shows the further progress of enlarging the lateral passage 36, which may be employed as the ultimate lateral passage of the final valve body, see Fig. 14. Advantageously, the drill 33 may be employed also to enlarge the flow passage, see 37, below the valve seat wall member 38.

The procedure subsequent to that indicated in Figs. 10 and 11 is to a degree optional, dependent upon detail structure which may be desired in the ultimate valve body. Fig. 12 illustrates a contouring of the valve seat wall member 38 for the utilization of the same as the valve seat, namely by the use of a shaper 39 having an effective face 39a suitably contoured for the desired formation of the valve seat 40. Also, if desired, the walls of the anterior and posterior flow passages 41, 42 may be reduced in effective thickness to provide for steps 43, 44 respectively for the passages of the end openings 41, 42, each to serve as a stop for predetermining the extent of insertion of a pipe and the area of telescoped overlap applicable for sweat jointing the end of a pipe or of a pipe fitting thereat, as is illustrated in Fig. 14.

The type of the movable valve member to be disposed within the lateral passage 36 will determine the manner of ultimate treatment of the lateral. In Fig. 1, I have illustrated an improved form of movable valve member, an advantage of which resides in the employment of threading, see 45, formed on the inner face of the wall 36 of the lateral, my stated movable valve member forming no part of my present invention.

As above disclosed, my invention is of particular utility in the production of integral valve bodies from copper, including so-termed commercially pure copper, alloys of high copper content, and other metallic composition comparable to copper in respect to the attribute of forming at elevated temperature oxids and other compounds introducing deleterious conditions.

As appears from Figs. 8 through 14, and as is also apparent from the valve body shown in Fig. 1, preferred embodiments of my invention have a lateral, the wall of which has a cubical content exceeding the cubical content of the zone, compare 20—8, Fig. 8, defined in its outer boundary by the outer periphery of the lateral, such zone having a wall thickness equal to the wall thickness of the body.

By my invention, the resulting integral wrought valve body, possesses inherent distinctive properties ensuing from the cold working and attendant cold flow of the metal, particularly commercially pure copper and metal of predominant copper content, the attributes of which include condensed grain structure imparting high tensile strength, high degree of hardness, immunity to oxidation and/or other deterioration arising from contact with water, liquids and/or gases of the nature of water within the range of atmospheric temperatures, thermal heating media, domestic and industrial water supply, refrigeration agents, etc., applicable in the major fields of the more common types of conveyed liquids.

Whereas I have described my invention by reference to specific forms thereof it will be understood that many changes and modifications may be made without departing from the spirit of the invention, it being understood that the resulting valve body may be varied ad libitum with respect to wall thickness and configurations of its component parts, with respect to relative dimensions of its component parts, provided with threading and/or smooth faces or otherwise at the respective body end and lateral openings for connections with the ends of piping, tubing and/or with one or more ends of other pipe fitting or fittings, the formation of more than one lateral passage, the angular relationship of such one or more lateral passages to the passages through the body per se, and like variations now apparent to one skilled in the art in the light of the disclosure above set forth.

I claim:

1. The method of producing a valve body of integral wrought metal predominantly of copper content, having a lateral opening and body end openings, and having further an interior wall formation provided with a horizontally extending face serving as a seat or seat support for a movable valve member mounted in the lateral opening, said horizontally extending face being provided with an opening communicating respectively with the body end openings; which comprises subjecting a solid mass of material predominantly of copper content to a succession of cold wrought operations by cooperating punches and plugs to progressively form the body end openings and the lateral, inclusive of its opening, and to provide a wall formation, in line with the longitudinal axis of the lateral opening, interiorly of the valve body and integral with the wall of the valve body, such wall formation having a horizontally extending face; and removing portions interiorly of the valve body to provide an opening through said interior wall formation at its horizontally extending face which effects intercommunication between said body end openings and said lateral openings.

2. The method of producing a wholly integral solely cold-worked article having angularly related branches which are open-ended and hollow, from a substantially straight lengthed solid mass of metal predominantly of copper content which comprises; confining said mass of metal within a die recessed according to the desired branching outer configuration of the resulting article; and subjecting the opposite ends of the said mass of metal to the action of punches in progressive steps for effecting cold flow of metal from a location intermediate the ends of said mass of metal laterally into the unfilled recess portions of the die while guiding and limiting the flow thereof.

3. The method of producing a wholly integral solely cold-worked article having angularly related branches which are open-ended and hollow, from a substantially straight lengthed solid mass of metal predominantly of copper content which comprises; confining said mass of metal within a die recessed according to the desired branching outer configuration of the resulting article; and subjecting the opposite ends of the said mass of metal to the action of punches in progressive steps for effecting cold flow of metal from a location intermediate the ends of said mass of metal laterally into the unfilled recess portions of the die while guiding and limiting the flow thereof; and subjecting the metal displaced laterally of the said mass to punch action while precluding flow of metal at or to those portions of the die at which said opposite ends of the mass of metal are disposed.

4. The method of producing a wholly integral solely cold-worked valve body of metal predominantly of copper content from a substantially straight lengthed solid cylinder of metal predominantly of copper content, which comprises confining said cylinder of metal within a die recessed according to the desired branching outer configuration of the resulting valve body; and subjecting the opposite ends of the said cylinder of metal to the progressive action of punches in progressive steps for effecting cold flow of metal from a location intermediate the ends of said cylinder of metal laterally into the unfilled recess portions of the die while guiding and limiting the flow thereof, thus shaping the outer configuration of the valve body and providing openings in the respective ends thereof inclusive of the metal displaced laterally of the said mass; and removing a portion of the metal from the interior of the partially formed valve-body to form a valve seat between the end openings of the valve body, and to interconnect said end openings.

5. The method of producing a wholly integral solely cold-worked valve body defining substantially straight passage means and a lateral passage angularly intersecting the first named passage intermediate the ends thereof, from a substantially straight lengthed solid mass of metal predominantly of copper content, which comprises confining said mass of metal within a die recessed according to the outer configuration of the resulting valve body; subjecting the opposite ends of the said mass of metal substantially centrally thereof to the action of pointed punches for effecting cold flow of metal from intermediate the said mass of metal into a lateral forming recess portion of the die, while guiding and limiting the said flow by a substantially blunt ended plug; subjecting the opposite ends of said mass of metal to the action of snub-nosed punches smaller in transverse cross-section than the transverse cross-section of the corresponding portions of the die recess while maintaining the said plug in position for completing the filling of the free space of the die recesses; removing portions of the metal from the end openings so formed in the said opposite ends of the mass of metal; removing the said plug and subjecting the gathered metal in said lateral forming recess to the action of a snub-nosed punch, smaller in transverse cross-section than the transverse cross-section of said gathered metal, for forming walls for the said lateral passage of the valve body, this being accomplished while precluding flow of metal at other locations in the partially formed valve body; and removing portions of the solid metal interior of the partially formed valve body in such manner as to form valve seating means defining a valve opening which interconnects the said opposite end openings and the said lateral passage of the valve body.

6. The method of producing from a solid blank of metal of predominantly copper content a wholly integral solely cold-worked article having angularly related, open-ended, and hollow branches, which comprises confining the said blank of metal within a die recessed according to the desired angularly branched outer configuration of the resulting article, and cold flowing metal laterally from the interior of said blank of metal to unfilled recess portions of the die.

7. The method of producing a wholly integral solely cold-worked valve body from a solid blank of metal predominantly of copper content, which comprises confining said blank within a die recessed according to the desired angularly branched outer configuration of the resulting valve body; subjecting opposite ends of the blank to the action of pointed punches for initiating cold flow of metal from intermediate said blank into unfilled recesses of the die while guiding and limiting the said flow by plug means; subjecting the thus partially formed ends of said blank to the action of snub-nosed punches for completing cold flow of metal into the unfilled recesses of the die; subjecting the partially formed blank to further punch action to complete the desired branch formation while precluding flow of metal at the said opposite end portions; and removing portions of the solid metal interior of the partially formed valve body in such manner as to form a valve seating means defining a valve opening which interconnects the branch openings of the valve body.

8. The method of producing a wholly integral solely cold-worked valve body defining substantially straight passage means and a lateral passage angularly intersecting the first named passage intermediate the ends thereof, from a substantially straight lengthed solid mass of metal predominantly of copper content, which comprises confining said mass of metal within a die recessed according to the outer configuration of the resulting valve body; subjecting the opposite ends of the said mass of metal substantially centrally thereof to the action of pointed punches for effecting cold flow of metal from intermediate the said mass of metal into a lateral forming recess portion of the die, while guiding and limiting the said flow by a substantially blunt ended plug; subjecting the opposite ends of said mass of metal to the action of snub-nosed punches smaller in transverse cross-section than the transverse cross-section of the corresponding portions of the die recess while maintaining the said plug in position for completing the filling of the free space of the die recesses; removing portions of the metal from the end openings so formed in the said opposite ends of the mass of metal; removing the said plug and subjecting the gathered metal in said lateral forming recess to the action of a snub-nosed punch, smaller in transverse cross-section than the transverse cross-section of said gathered metal, for forming wall for the said lateral passage of the valve body, this being accomplished while precluding flow of metal at other locations in the partially formed valve body; and removing metal from a lower and an upper portion of the solid metal interior of the partially formed valve body to provide a horizontal wall which is disposed opposite the said lateral passage, and which is supported by an upper substantially vertical wall at one end and a lower substantially vertical wall at the other end, the said walls closing communication between the opposite end openings of the valve body; and removing metal from said horizontal wall to provide a valve opening directly opposite the said lateral passage.

9. A valve body of cold wrought integral metal predominantly of copper content, comprising a body proper having open-ended hollow end portions, and an open-ended hollow lateral extending from the body proper intermediate the said end portions thereof; a flow passage through the body proper effecting intercommunication between said end portions; a passage through the lateral intersecting the said flow passage, said lateral passage being adapted to operably receive movable valve mechanism; and valve seating means disposed within said flow passage for cooperation with the movable valve of said lateral passage, said valve seating means being integral in itself and integral with the valve body; the valve body being devoid of joint and integral throughout having superior tensile strength and superior resistance to corrosion in use, such qualities resulting from subjecting a substantially straight lengthed mass of metal predominantly of copper content, to punch action within the confines of a die for effecting cold flow of portions of the said mass of metal.

10. A valve body of said wrought integral metal predominantly of copper content, comprising a body proper having open-ended hollow end portions, and a lateral extending from the body proper intermediate the said end portions thereof, said lateral being open-ended and hollow and adapted to operably receive movable valve mechanism; valve seating means disposed within the said body proper and having a valve opening adapted for cooperation with the movable valve mechanism of said lateral, said valve means closing passage between said open-ended hollow end portions of the body proper except as provided by said valve opening, and said valve seating means, further, being wholly integral in itself and integral with said body proper; the entire valve body being devoid of joint and integral throughout, having superior tensile strength, superior hardness and superior resistance to corrosion in use, said qualities and said configuration resulting from subjecting a substantially straight lengthed mass of metal, predominantly of copper content, to punch action within the confines of a die for effecting cold flow of portions of the said mass of metal.

11. The method of producing valve bodies of integral wrought metal predominantly of copper content, which comprises subjecting a mass of metal predominantly of copper content and of predetermined cubical content to a succession of cold working operations with attendant cold flow of the metal by recess-forming punch action and associated plug action to progressively form a body proper having a substantially solid interior and hollow, open-ended, angularly related branches, and removing portions of the metal from the interior of the thus treated mass to form valve seating means integral with said body proper and to effect intercommunication of said hollow, open-ended, angularly related branches through said valve seating means.

12. The method of producing valve bodies of integral wrought metal predominantly of copper content, which comprises subjecting a mass of metal predominantly of copper content and of predetermined cubical content to a succession of cold working operations with attendant cold flow of the metal by recess-forming punch action and associated plug action to progressively form a body proper having a substantially solid interior and hollow, open-ended, angularly related branches, and removing portions of the metal from the interior of the thus treated mass, to form valve seating means integral with the body and to interconnect said hollow, open-ended, angularly related branches through said valve seating means; and contouring the said valve seating means to serve as, or for the support of a seat of a movable valve member operatively positioned in one of said hollow, open-ended branches.

13. The method of producing valve bodies of integral wrought metal predominantly of copper content, which comprises subjecting a mass of metal predominantly of copper content and of predetermined cubical content to a succession of cold working operations with attendant cold flow of the metal by recess-forming punch action and associated plug action to progressively form a body proper having a substantially solid interior and hollow, open-ended, angularly related branches; removing portions of the metal from the interior of the thus treated mass to form a wall member integral with the valve body and having a portion extending transversely across the opening of one of the said hollow, open-ended branches and to effect intercommunication of the said hollow, open-ended, angularly related branches through said transversely extending wall portion; and contouring said transversely extending wall portion to serve as, or for the support of a seat for a movable valve member operatively positioned in the said hollow, open-ended branch across which the said wall portion extends.

EDWARD S. CORNELL, Jr.